United States Patent Office 3,530,115
Patented Sept. 22, 1970

3,530,115
ACYL DERIVATIVES OF 6-AMINO PENICILLANIC ACID
Karl Vogler, Riehen, and Guido Zanetti, Reinach, Switzerland, assignors to Hoffmann-La Roche Inc., Nutley, N.J., a corporation of New Jersey
No Drawing. Filed Feb. 28, 1968, Ser. No. 708,797
Claims priority, application Switzerland, Mar. 3, 1967, 3,159/67
Int. Cl. C07d 99/16
U.S. Cl. 260—239.1
26 Claims

ABSTRACT OF THE DISCLOSURE

Processes for the preparation of acyl derivatives of 6-aminopenicillanic acid and the pharmaceutically acceptable, non-toxic salts of these acids are disclosed. Such processes involve reaction of an acid compound of the formula:

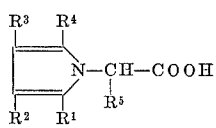

with 6-aminopenicillanic acid to yield novel (pyrrol or substituted pyrrol-1-yl-methyl)-penicillins. These compounds are useful as antibacterial agents.

BRIEF DESCRIPTION OF THE INVENTION

The invention relates to novel acyl derivatives of 6-aminopenicillanic acid useful as antibiotics and to processes useful in their preparation. More particularly, the invention relates to processes for the preparation of and novel antibiotic compounds of the formula

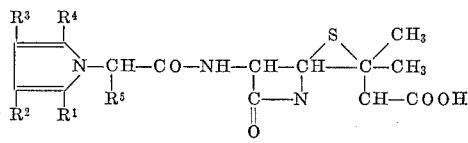

where $R^1$, $R^2$, $R^3$, and $R^4$ independently of each other are hydrogen, halogen, lower alkyl, lower alkenyl, cycloalkyl, cycloalkenyl, aralkyl, aryl, substituted aryl, cyano, carboxyl, carbalkoxy, hydroxy, lower alkoxy, lower-alkylthio, lower alkylsulphonyl, nitro, nitroso, azido, amino, lower-alkylamino, di(lower alkyl)-amino, carbamino or formyl, halo-(lower alkyl), (lower alkoxy)-(lower alkyl), hydroxy-(lower alkyl), amino-(lower alkyl), (lower alkylamino)-(lower alkyl), [di(lower alkyl)-amino]-(lower alkyl), acyl, sulphamido (which may be substituted), or a heterocyclic group; $R^5$ is hydrogen, lower alkyl, halo-(lower alkyl), cyano-(lower alkyl), amino-(lower alkyl), hydroxy-(lower alkyl), carboxy-(lower alkyl), (lower alkylamino)-(lower alkyl), (carbalkoxy)-(lower alkyl), lower alkenyl, cycloalkyl, aralkyl, aryl, substituted aryl, (arylsulfonylamino)-(lower alkyl), (lower alkylsulfonyl-amino)-(lower alkyl), or carbalkoxy, as well as pharmaceutically acceptable, non-toxic salts of the above compounds.

In a preferred embodiment of the present invention, $R^1$, $R^2$, $R^3$, and $R^4$ independently of each other are hydrogen, lower alkyl, lower alkoxy, carboxyl, nitro, and cyano. In the specially preferred embodiment $R^1$ is hydrogen, nitro or cyano and $R^2$, $R^3$ and $R^4$ are hydrogen. In the preferred embodiment of this invention, $R^5$ is hydrogen, lower alkyl (especially having 1–4 carbon atoms), hydroxy lower alkyl, amino lower alkyl, aryl, most preferably phenyl and phenyl lower alkyl, most preferably benzyl. In a most preferred embodiment $R^5$ is hydroxy lower alkyl or amino lower alkyl.

Preferred compounds in accordance with the present invention include the following:

(2-nitro-pyrrol-1-yl-methyl)-penicillin;
(Pyrrol-1-yl-methyl)-penicillin;
(2-ethoxycarbonyl-3,4,5-trimethylpyrrol-1-yl-methyl)-penicillin;
(2,5-dimethylpyrrol-1-yl-methyl)-penicillin;
(3-acetyl-5-ethoxy-2,4-dimethylpyrrol-1-yl-methyl)-penicillin;
(2-cyanopyrrol-1-yl-methyl)-penicillin;
(2-methyl-1-pyrrol-1-yl-propyl)-penicillin;
(α-pyrrol-1-yl-phenylethyl)-penicillin;
(2-hydroxy-1-pyrrol-1-yl-ethyl)-penicillin;
(2-amino-1-pyrrol-1-yl-ethyl)-penicillin;
[(R)-α-pyrrol-1-yl-benzyl]-penicillin;

and pharmaceutically acceptable non-toxic salts of the above. Such salts include the alkali metal salts, preferably the sodium or potassium salts and most preferably the potassium salts. Included further in the scope of the present invention are the optical antipodes of those compounds in the above list which are optically active.

The process in accordance with the invention is characterized in that an acid of the general formula:

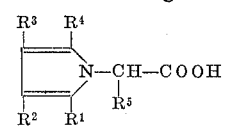
II where $R^1$, $R^2$, $R^3$, $R^4$, and $R^5$ are as above, or a reactive derivative thereof such as a halide (e.g., the chloride), an ester (e.g., an aryl ester) or an amide (e.g., an imidazolide) is condensed with 6-aminopenicillanic acid or its salt.

The acid corresponding to Formula II when $R^5$ is not a hydrogen, can be obtained in optically active form or as the racemate.

DETAILED DESCRIPTION OF THE INVENTION

The term lower alkyl group throughout is to be understood to mean a straight-chain or branched aliphatic hydrocarbon group with 1–7 carbon atoms. Examples thereof include methyl, ethyl, propyl, butyl, pentyl, hexyl, heptyl and their isomers. Examples of lower alkenyl groups include vinyl, allyl, methallyl, pentenyl, hexenyl, and heptenyl. Examples of cycloalkyl groups include cyclobutyl, cyclopentyl, cyclohexyl and cycloheptyl. Examples of cycloalkenyl groups include the cyclopentenyl and cyclohexenyl groups. The benzyl group is an example of an aralkyl group. Aryl groups include 1 and 2-nuclear aromatic groups such as phenyl or naphthyl, which may be substituted by halogen, lower alkyl or lower alkoxy groups. The term halogen includes fluorine, chlorine, bromine and iodine. Examples of an arylsulfonylamino-lower alkyl group include for example a tosylamino-methyl or -ethyl group. (Lower alkyl-sulfonylamino)-lower alkyl groups include the mesylamino-lower alkyl groups such as mesylamino-methyl or -ethyl.

A heterocyclic group represented by the symbols $R^1$, $R^2$, $R^3$ or $R^4$ is preferably a 5- or 6-membered saturated or unsaturated group with nitrogen and/or oxygen and/or sulphur as hetero atoms. Examples of such heterocyclic groups are pyridyl, pyrimidyl, pyrazyl, piperidinyl, pyrrolyl, imidazolyl, pyrrolidinyl, furyl, thienyl, oxazolyl, isoxazolyl, thiazolyl.

A substituted sulphamido group includes, for example, an arylsulphamido group substituted by lower alkyl groups and/or halogen such as the p-tosylamido or p-chlorobenzenesulphamido residues. Examples of acyl groups include the lower alkanoyl groups such as acetyl or propionyl and aroyl groups such as benzoyl or toluyl.

The condensation of the acid of Formula II or reactive derivatives thereof with 6-aminopenicillanic acid or salts thereof in accordance with the invention can be carried out in a variety of ways. Thus, for example, the free acid can be condensed in the presence of a carbodiimide such as N,N'-dicyclohexylcarbodiimide to give the amide. Furthermore, cyanamides, ethoxyacetylene or isoxazolium salts can be employed for activating the carboxyl group. An activation of the carboxyl group can also be achieved by formation of a mixed anhydride with organic or inorganic acids. When using optically active acids, the azides or activated esters such as the hydroxysuccinimide esters or the 1-piperidyl esters are preferably made use of in order to retain the configuration. Examples of activated acid derivatives which are suitable for the condensation reaction in accordance with the present invention include the activated amides of the pyrrole, imidazole or 1,2,4-triazole series as well as the α-aminocarboxylic acids and N-carboxy anhydrides (oxazolidine-2,5-diones).

The temperature at which the condensation reaction is carried out is not critical. However, the process of the present invention may conveniently be carried out at a temperature in the range between about +50 to —70° C., preferably between +30 and —30° C. It is further desired that the reaction environment not be too strongly alkaline or acidic (e.g., between pH 3 and pH 9 would be preferred). Organic solvents, especially those which are inert to the reactants and condensation agents which may be present, are suitable as the reaction medium. Such solvents are, for example, chlorinated hydrocarbons such as methylene chloride or chloroform; ethers such as tetrahydrofuran or dioxane; or dimethylformamide.

The starting compounds can, insofar as they are not known, be manufactured in a manner known per se.

The novel compounds of the present invention are biologically active and have been found to possess antibacterial activity both against gram-positive and gram-negative causative organisms. As indicated, they are useful antimicrobial agents and have high antimicrobial activity in vitro against standard laboratory microorganism used to screen for activity against pathogens.

The compounds of the present invention can be used as therapeutics and disinfectants. Accordingly, they can be used in the form of pharmaceutical preparations which contain them or their salts in admixture with a pharmaceutical, organic or inorganic inert carrier material which are suitable for enteral, percutaneous or parenteral application. Suitable carrier materials include, for example, water, gelatin, gum arabic, lactose, starches, magnesium stearate, talc, vegetable oils, polyalkyleneglycols, petroleum jelly, etc. The pharmaceutical preparations can be submitted in solid form (e.g., as tablets, dragées, suppositories, capsules); in semi-solid form (e.g., as salves) or in liquid form (e.g., as solutions, suspensions or emulsions). They may be sterilized and/or contain additives such as preserving, stabilizing wetting or emulsifying agents, salts for varying the osmotic pressure or buffers. The aforesaid preparations may further be compounded with other therapeutically valuable substances such as other compounds having antibacterial activity.

The compounds of Formula I can be administered with dosage adjusted to pharmacological needs. Dosages can be given as a single unit dosage form or in divided dosage units. For oral administration, dosage units containing from about 100 mg. to 400 mg. of the compounds of the present invention can be used. When parenteral administration is employed dosage units containing from about 200 mg. to 300 mg. of the compounds of Formula I can be used. Daily dosages of from about 10 mg./kg. of body weight to about 40 mg./kg. of body weight can be used when the compounds of Formula I are administered orally and when administered parenterally, daily dosages of from 10 mg./kg. to about 25 mg./kg. of body weight can be used. These dosage figures are in no way critical and should, of course, be adjusted according to the best judgment of the person administering the compound and depending on the result desired and the reason for which the compound is being administered.

The following examples are illustrative of this invention but not limitative thereof. All temperatures are stated in degrees centigrade.

EXAMPLE 1

Preparation of potassium (2-nitro-pyrrol-1-yl-methyl)-penicillin

A solution of 17.0 g. of 2-nitro-pyrrole-1-acetic acid and 10.1 g. of triethylamine in 200 ml. of abs. tetrahydrofuran, cooled to —15° C., is treated with 10.8 g. of chloroformic acid ethyl ester and stirred at —15° for 30 minutes. An ice-cold solution of 16.2 g. of 6-aminopenicillanic acid and 7.5 g. of triethylamine in 100 ml. of water is thereupon added during a period of 15 minutes. The resulting solution, which after 2½ hours has reached room temperature, is then stirred for a further 2 hours. The tetrahydrofuran is removed in vacuum, the neutral, aqueous solution is shaken out twice with 100 ml. of ether, cooled to 2° and adjusted to pH=2.2 with 1 N hydrochloric acid. The precipitated (2-nitro-pyrrol-1-yl-methyl)-penicillin is extracted with 500 ml. of ether. The ethereal solution is washed twice with 100 ml. of water, dried over anhydrous magnesium sulphate, cooled with ice and treated with stirring with 35 ml. of a 2-M solution of potassium 2-ethylcaproate in isopropanol which has been diluted with 200 ml. of abs. ether. The precipitated potassium (2-nitro-pyrrol-1-yl-methyl)-penicillin is separated off and recrystallized from methanol/ethanol. Colorless needles are obtained; M.P. 226° dec.; $[\alpha]_D^{25}+280°$ (c.=1 in water).

EXAMPLE 2

Preparation of potassium (pyrrol-1-yl-methyl)-penicillin

A solution of 6.2 g. of pyrrole-1-acetic acid and 5 g. of triethylamine in 100 ml. of abs. tetrahydrofuran, cooled to —15°, is treated with 5.4 g. of chloroformic acid ethyl ester and stirred at —15° for 30 minutes. An ice-cold solution of 7.5 g. of 6-aminopenicillanic acid and 3.5 g. of triethylamine in 50 ml. of water is thereupon added during a period of 10 minutes. The solution is allowed to warm to room temperature, and stirred for a further 15 hours. The tetrahydrofuran is removed in vacuum, the neutral, aqueous solution is shaken out twice with 100 ml. of ether, cooled to 2° and adjusted to pH=2.2 with 1 N hydrochloric acid. The oily precipitated (pyrrol-1-yl-methyl)-penicillin is extracted with 200 ml. of ether. The ethereal solution is washed with 100 ml. of water, dried over anhydrous magnesium sulphate and treated with stirring and ice-cooling with 15 ml. of a 2 M solution of potassium 2-ethylcaproate in isopropanol which has been diluted with 50 ml. of abs. ether. The precipitated potassium (pyrrol-1-yl-methyl)-penicillin is separated off, washed with abs. ether and recrystallized from water/alcohol. Colorless needles are obtained; M.P. 250° dec.; $[\alpha]_D^{25}+254°$ (c.=1 in water).

EXAMPLE 3

A solution of 9.6 g. of 2-ethoxycarbonyl-3,4,5-trimethyl-pyrrole-1-acetic acid and 4 g. of triethylamine in 100 ml. of chloroform is cooled to —15°. To it, there is added 4.3 g. of chloroformic acid ethyl ester. The so-obtained mixture is stirred for 30 minutes at —15°. There is then added over a period of 30 minutes to the so-obtained stirred mixture, a suspension of 8.6 g. of 6-aminopenicillanic acid and 4 g. of triethylamine in 100 ml. of chloroform. The solution is allowed to warm to room temperature and it is then stirred for an additional 15 hours. The chloroform is removed in vacuum and the residue is added to 150 ml. of ice water. The aqueous solution is extracted with 200 ml. of ether, cooled to 2° and the pH adjusted to 2.2 with 1 N hydrochloric acid.

The precipitated [(2-ethoxycarbonyl-3,4,5-trimethylpyrrole-1-yl)-methyl]-penicillin is extracted with 500 ml. of ether. The so-obtained ethereal solution is washed with 200 ml. of water, dried over anhydrous magnesium sulphate and treated with stirring and ice cooling with a mixture of 80 ml. of absolute ether and 18 ml. of a 2 M solution of potassium-2-ethylcaproate in isopropanol. The precipitate which forms is separated and washed with absolute ether. The precipitate after washing is crystallized from methanol-isopropanol yielding potassium [(2-ethoxycarbonyl - 3,4,5-trimethylpyrrole-1-yl) - methyl]-penicillin of M.P. 110 (with slow decomposition) $[\alpha]_D^{25}+150°$ (c.=1 in water).

EXAMPLE 4

A solution of 6.9 g. of 2,5-dimethylpyrrole-1-acetic acid and 4.5 g. of triethylamine in 100 ml. of chloroform is cooled to −15°. To it, there is added 4.9 g. of chloroformic acid ethyl ester. The so-obtained mixture is stirred for 30 minutes at −15°. There is then added over a period of 30 minutes to the so-obtained stirred mixture a suspension of 9.7 g. of 6-aminopenicillanic acid and 4.5 g. of triethylamine in 100 ml. of chloroform. The solution is allowed to warm to room temperature and it is then stirred for an additional 15 hours. The chloroform is removed in vacuum and the residue is added to 150 ml. of ice water. The aqueous solution is extracted with 200 ml. of ether, cooled to 2° and the pH adjusted to 2.1 with 1 N hydrochloric acid.

The precipitated [(2,5-dimethylpyrrole-1-yl)-methyl]-penicillin is washed with water and dissolved in 200 ml. of acetic acid ethyl ester. The last mentioned solution is washed with 200 ml. of water and treated with stirring and ice cooling with a mixture of 80 ml. of absolute ether and 20 ml. of a 2 M solution of potassium-2-ethylcaproate in isopropanol. The precipitate which forms is separated and washed with absolute ether. The precipitate after washing is crystallized from an ethanol-isopropanol yielding potassium [(2,5-dimethylpyrrole-1-yl)-methyl]-penicillin as a colorless amorphous powder, M.P. 215°.

EXAMPLE 5

A solution of 10.7 g. of 3-acetyl-5-ethoxycarbonyl-2,4-dimethylpyrrole-1-acetic acid and 4 g. of triethylamine in 100 ml. of chloroform is cooled to −15°. To it is added 4.3 g. of chloroformic acid ethyl ester. The so-obtained mixture is stirred for 30 minutes at −15°. There is then added over a period of 30 minutes to the so-obtained stirred mixture a suspension of 8.6 g. of 6-aminopenicillanic acid and 4 g. of triethylamine in 100 ml. of chloroform. The solution is allowed to warm to room temperature and it is then stirred for an additional 15 hours. The chloroform is removed in vacuum and the residue is added to 150 ml. of ice water. The aqueous solution is extracted with 200 ml. of ether, cooled to 2° and the pH is adjusted to 2.0 with 1 N hydrochloric acid. The precipitated [(3-acetyl-5-ethoxycarbonyl-2,4-dimethylpyrrole-1-yl)-methyl]-penicillin is extracted with 400 ml. of acetic acid ethyl ester. The so-obtained extract is washed with 200 ml. of water, dried over anhydrous magnesium sulphate and treated with stirring and ice cooling with a mixture of 100 ml. of absolute ether and 20 ml. of a 2 M solution of potassium-2-ethylcaproate in isopropanol. The precipitate which forms is separated and washed with absolute ether and then with absolute methanol. The precipitate is then crystallized from a methanol/abs. isopropanol mixture yielding potassium [(3 - acetyl - 5 - ethoxycarbonyl - 2,4 - dimethylpyrrole-1-yl)-methyl]-penicillin. M.P. 135° (dec.).

EXAMPLE 6

A solution of 7.5 g. of 2-cyanopyrrole-1-acetic acid and 5 g. of triethylamine in 100 ml. of chloroform is cooled to −15°. To it, there is added 6 g. of pivaloyl chloride. The so-obtained mixture is stirred for 30 minutes at −15°. To the so-obtained mixture, there is added a solution of 10.8 g. of 6-aminopenicillanic acid and 10.1 g. of triethylamine in 100 ml. of chloroform which solution has been cooled to −40°. The solution is allowed to warm to room temperature and is thereafter stirred for an additional 15 hours. The solution is extracted with 200 ml. of ice water. The aqueous solution so obtained is cooled to 2° and then is adjusted to pH 2 with 1 N hydrochloric acid. The precipitated [(2-cyanopyrrole-1-yl)-methyl]-penicillin is extracted with 300 ml. of acetic acid ethyl ester. The acetic acid ethyl ester solution is washed with 200 ml. of water, dried over anhydrous magnesium sulfate and reduced in vacuum to a volume of about 50 ml. To the so-obtained medium 600 ml. of low boiling petroleum ether is added. [(2-cyano-pyrrole-1-yl)-methyl]-penicillin which precipitates is separated, washed with low boiling petroleum ether, dried and dissolved in 50 ml. of acetic acid ethyl ester. The so-obtained solution is diluted with 250 ml. of absolute ether and to the so-diluted solution, with stirring and ice cooling, there is added 80 ml. of absolute ether and 20 ml. of a 2 M solution of potassium 2-ethylcaproate in isopropanol. The precipitated potassium [(2-cyanopyrrol-1-yl)-methyl]-penicillin is removed with suction, washed with absolute ether and recrystallized from methanol-absolute ethanol. One obtains accordingly colorless needles of M.P. 231–233° dec.

EXAMPLE 7

A solution of 10 g. of DL-α-isopropyl-pyrrole-1-acetic acid and 6.1 g. triethylamine in 100 ml. in chloroform was cooled to −15°. To it was added 7.2 g. of pivaloyl chloride. The resulting medium was stirred for 30 minutes at −15°. To the so-stirred medium there was added a solution of 13 g. of 6-aminopenicillanic acid and 12.1 g. of triethylamine in 100 ml. of chloroform, which solution had been cooled to −40° prior to its addition. The so-obtained solution is allowed to warm to room temperature and then is stirred for an additional 15 hours. The solution is extracted with 100 ml. of ice water. The chloroform phase is dried with anhydrous calcium chloride and evaporated in vacuum. The residue is dissolved in 50 ml. of acetic acid ethyl ester. After standing for 3 hours at 0°, crystalline (2-methyl-1-pyrrole-1-yl-propyl)-penicillin-triethylammonium salt (isomer A) precipitates. The precipitate is washed with acetic acid ethyl ester and dried leaving colorless needles, M.P. 145–146° dec.

The mother liquor is evaporated in vacuum. The so-obtained residue is dissolved in 100 ml. of ice water, the aqueous solution is shaken out with 200 ml. of ether, cooled to 2° and adjusted to pH 2 with 1 N hydrochloric acid. The precipitated (2-methyl-1-pyrrole-1-yl-propyl)-penicillin (isomer B) is extracted with 300 ml. of acetic acid ethyl ester. The acetic acid solution is washed with 300 ml. of water, dried with anyhydrous magnesium sulphate, evaporated in vacuum to about 50 ml. and treated with low boiling petroleum ether whereby (2-methyl-1-pyrrole-1-yl-propyl)-penicillin (isomer B) precipitates. The so-obtained precipitate is washed with low boiling petroleum ether, dried and dissolved in 50 ml. acetic acid ethyl ester. To the so-obtained solution there is added 200 ml. of absolute ether. With stirring and ice cooling there is further added 80 ml. of absolute ether and 20 ml. of a 2 M solution of potassium 2-ethylcaproate in isopropanol. The so-obtained solution is evaporated in vacuum. The residue is dissolved in 100 ml. of absolute ether and this solution is treated with 500 ml. of low boiling petroleum ether. The precipitated potassium (2-methyl-1-pyrrole-1-yl-propyl)-penicillin (isomer B) is recrystallized from absolute ethanol/low boiling petroleum ether and dried yielding a colorless amorphous powder of M.P. 205–207° dec.: $[\alpha]_D^{25}+179.5°$ (c.=1 in water).

A cooled solution (2°) of 6 g. of (2-methyl-1-pyrrole-1-yl-propyl)-penicillin-triethylammonium salt (isomer A) in 50 ml. of water is adjusted to pH=2 with 1 N hydrochloric acid. The precipitated (2-methyl-1-pyrrole-1-yl-propyl)-penicillin (isomer A) is extracted with 200 ml. of acetic acid ethyl ester. The acetic acid ethyl ester solution is washed with 100 ml. of water, dried over anhydrous magnesium sulphate and treated with stirring and ice cooling with 2 M solution of potassium 2-ethylcaproate in isopropanol which has been diluted with 100 ml. of absolute ether. The so-obtained solution is evaporated in vacuum and to the residue is then added absolute ether. The crystalline potassium (2-methyl-1-pyrrole-1-yl - propyl) - penicillin (isomer A) which precipitates is washed with absolute ether and recrystallized from absolute ethanol absolute ether. One obtains colorless needles of the product of M.P. 225° dec.: $[\alpha]_D^{25}+221.75°$ (c.=1 in water).

EXAMPLE 8

A solution of 10.8 g. of D-α-benzylpyrrole-1-acetic acid and 5 g. of triethylamine in 100 ml. of chloroform is cooled to −15°. To it is added 6 g. of pivaloyl chloride. The resulting medium is stirred for 30 minutes at −15°. To the so-stirred medium, there is added a solution of 10.8 g. of 6-aminopenicillanic acid and 10.1 g. of triethylamine in 100 ml. of chloroform, which solution had been cooled to −40°. The so-obtained solution is allowed to warm to room temperature and stirred for 70 hours. The solution is extracted with 100 ml. of ice water. The chloroform phase is dried over anhydrous calcium chloride and evaporated in vacuum. The residue is dissolved in 100 ml. of ice water. The aqueous solution is extracted with 200 ml. of ether, cooled to 2° and adjusted to pH 2 with 1 N hydrochloric acid. The precipitated [(R)-α-pyrrole-1-yl-phenethyl]-penicillin is extracted with 300 ml. of acetic acid ethyl ester. The acetic acid solution is washed with 200 ml. of water, dried over anhydrous magnesium sulphate, evaporated in vacuum to about 50 ml. and treated with 500 ml. of low boiling petroleum ether whereby [(R)-α-pyrrole-1-yl-phenethyl]-penicillin precipitates. The so-obtained precipitate is washed with low boiling petroleum ether, dried and dissolved in 50 ml. acetic acid ethyl ester. To the so-formed solution is added 250 ml. of abs. ether and with stirring and ice cooling there is added 80 ml. of abs. ether and 20 ml. of a 2 M solution of potassium 2-ethylcaproate in isopropanol. The potassium [(R) - α - pyrrole-1-yl-phenethyl]-penicillin which precipitates is washed with absolute ether and recrystallized from methanol-absolute ethanol and is obtained as colorless needles of M.P. 235° $[\alpha]_D^{25}+185.8°$ (c.=1 in water).

EXAMPLE 9

A solution of 8.5 g. of DL-α-(hydroxymethyl)-pyrrole-1-acetic acid and 5.6 g. of triethylamine in 100 ml. of chloroform is cooled to −15° and treated with 6.6 g. of pivaloyl chloride. The so-obtained mixture is stirred for 30 minutes at −15°. To the so-obtained stirred mixture a cooled solution (−40°) of 11.9 g. of 6-aminopenicillanic acid and 11.1 g. of triethylamine in 100 ml. of chloroform is added. The mixture is allowed to warm to room temperature and it is then stirred for an additional 70 hours. The solution is extracted with 200 ml. of ice water. The aqueous extract is cooled to 2° and the pH is adjusted to 2 with 1 N hydrochloric acid. The precipitated (2 - hydroxy - 1 - pyrrole-1-yl-ethyl)-penicillin is extracted with 300 ml. of acetic acid ethyl ester. The so-obtained extract is washed with 150 ml. of water, dried over anhydrous magnesium sulphate and evaporated in vacuo to about 50 ml. The (2-hydroxy-1-pyrrole-1-yl-ethyl)-penicillin which precipitates is washed with low boiling petrolium ether, dried and dissolved in 50 ml. of acetic acid ethyl ester. The solution is diluted with 200 ml. of absolute ether. With stirring and ice cooling, there is added to the so-diluted solution a mixture of 80 ml. of absolute ether and 20 ml. of a 2 M solution of potassium caproate in isopropanol. The precipitate which forms is separated and washed with absolute ether. Potassium (2-hydroxy-1-pyrrole-1-yl-ethyl)-penicillin which precipitates is washed with absolute ether and recrystallized from methanol-absolute ethanol giving the product as colorless needles of M.P. 233–234° dec.: $[\alpha]_D^{25}+194°$ (c.=1 in water).

EXAMPLE 10

A solution of 10.1 g. of D-α-phenyl-pyrrol-1-acetic acid and 5 g. of triethylamine in 100 ml. of chloroform is cooled to −15°. 6 g. of pivaloyl chloride are added and the mixture is stirred at −15° for 30 minutes. Subsequently, a solution of 10.8 g. of 6-aminopenicillanic acid and 10.1 g. of triethylamine in 100 ml. of chloroform, previously cooled to −40°, is added. The reaction mixture is allowed to warm to room temperature and stirred for 18 hours. The reaction mixture is then extracted with 120 ml. of ice water and the chloroform phase is dried over calcium chloride and evaporated in vacuum. The residue is taken up in 300 ml. of ice water. The aqueous solution is extracted with 200 ml. of ether and the ethereal extract is concentrated in vacuum to about 50 ml. and cooled to 2°, whereby triethylammonium [(R)-α-pyrrol-1-yl-benzyl]-penicillin crystallizes. The salt is separated, washed with water and dried.

6 g. of triethylammonium [(R)-α-pyrrol-1-yl-benzyl]-penicillin are dissolved in 400 ml. of water. The solution is cooled to 2° and adjusted to pH 2 by the addition of 1 N hydrochloric acid. The precipitate of [(R)-α-pyrrol-1-yl-benzyl]-penicillin is extracted with 400 ml. of ethyl acetate. The ethyl acetate solution is washed with 400 ml. of water, dried over anhydrous magnesium sulfate and evaporated in vacuum to a volume of about 50 ml. This solution is then diluted with 250 ml. of absolute ether and to the so-diluted solution, with stirring and ice cooling, there are added 92 ml. of ether and 8 ml. of a 2 M solution of potassium 2-ethylcaproate in isopropanol. The precipitated potassium [(R)-α-pyrrol-1-yl-benzyl]-penicillin is separated, washed with absolute ether and recrystallized from absolute ethanol-absolute ether. The product is obtained as an amorphous powder of melting point 198–200°, $[\alpha]_D^{25}+202°$ (c.=1 in water).

EXAMPLE 11

(a) Dry ampouls are prepared containing the following ingredients:

| | Mg. |
|---|---|
| Potassium (pyrrol-1-yl-methyl)-penicillin | 100.1 |
| Citric acid monohydrate | 1.1 |
| $Na_2HPO_4 \cdot 2H_2O$ | 8.8 |
| | 110.0 |

The ingredients are dissolved in distilled water, the solution is filtered sterile into 5 ml. ampouls and hydrolized.

(b) An oily suspension for injection is prepared from the following ingredients by usual techniques:

Potassium (pyrrol-1-yl-methyl)-penicillin—150 mg.
Aluminium stearate—20 mg.
Arachis oil—ad 2 ml.

EXAMPLE 12

This example demonstrates the antimicrobial activity of potassium (2-nitro - pyrrol - 1 - yl-methyl)-pencillin (Compound A), potassium (pyrrol - 1 - yl - methyl)-penicillin (Compound B) potassium [(2-ethoxycarbonyl-3,4,5-trimethylpyrrol - 1 - yl)-methyl]-penicillin (Compound C), potassium [(2,5-dimethylpyrrol-1-yl)-methyl]-penicillin (Compound D), potassium [(3-acetyl - 5 - ethoxy-carbonyl-2,4-dimethylpyrrol - 1 - yl)-methyl]-penicillin (Compound E), potassium [(2-cyanopyrrol-1-yl)-methyl]-penicillin (Compound F), potassium (2-methyl-1-yl-propyl)-penicillin [(isomer A=Compound G); (isomer B=Compound H)], potassium [(R)-α-pyrrol-1-yl-phenylethyl]-penicillin (Compound I), and potassium (2-hydroxy-1-pyrrol-1-yl-ethyl)-penicillin (Compound J) prepared in accordance with the preceeding examples.

The antibacterial spectrum of the aforesaid compounds representing the minimum concentration required to inhibit the growth of various typical bacteria was determined in a standard manner by the two-fold dilution serial method in broth. The following table summarizes the in vitro activity of these enumerated compounds.

MINIMUM INHIBITORY CONC. (mcg./ml.)

| Organism | Compound | | | | | | | | | |
|---|---|---|---|---|---|---|---|---|---|---|
| | A | B | C | D | E | F | G | H | I | J |
| Staphylococcus aureus FDA | 1.25 | 1.25 | 1.25 | .625 | .3 | .312 | 1.25 | 1.25 | .62 | 1.25 |
| Staphylococcus aureus 866 (penicillin-resistent) | >625 | >625 | >78 | 78 | 156 | >312 | | >312 | >312 | >312 |
| Escherichia coli 1356 | 19.5 | 10 | >312 | 78 | 39 | 39 | 312 | 312 | 312 | 10 |

What is claimed is:
1. Compounds of the general formula:

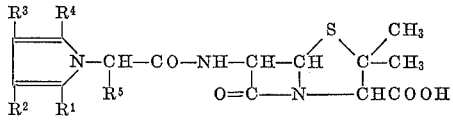

in which $R^1$, $R^2$, $R^3$, $R^4$ independently of each other are hydrogen, halogen, lower alkyl, lower alkenyl, cycloalkyl having from 4 to 7 carbon atoms, cycloalkenyl having 5 or 6 carbon atoms, phenyl lower-alkyl, phenyl, phenyl substituted with halogen, lower alkyl or lower alkoxy, cyano, carboxyl, carbalkoxy, hydroxy, lower alkoxy, lower alkylthio, lower alkylsulfonyl, nitro nitroso, azido, amino, lower alkylamino, di-(lower alkyl)amino, carbamino or formyl, halo-(lower alkyl), (lower alkoxy)-(lower alkyl), hydroxy-(lower alkyl), (di (lower alkyl)-amino)-(lower alkyl), lower alkanoyl, benzoyl or toluyl; $R^5$ is hydrogen, lower alkyl, halo-(lower alkyl), cyano-(lower alkyl), amino-(lower alkyl), hydroxy lower alkyl, carboxy-(lower alkyl), (lower alkylamino)-(lower alkyl), carbalkoxy-(lower alkyl), lower alkenyl, cycloalkyl having 4 to 7 carbon atoms, cycloalkenyl having 5 or 6 carbon atoms, phenyl lower alkyl, phenyl, phenyl substituted with halogen, lower alkyl or lower alkoxy, tosylsulphamino-lower alkyl, (lower alkylsulfonylamino)-lower alkyl, or carbalkoxy and the pharmaceutically acceptable non-toxic salts thereof.

2. The compounds of claim 1 wherein $R^5$ is substituted with groups other than hydrogen, the optical antipodes of said compounds and the non-toxic salts thereof.

3. The compounds of claim 1 wherein $R^1$ is nitro; $R^2$, $R^3$, $R^4$, $R^5$ are hydrogen, which is (2-nitropyrrol-1-yl-methyl)-penicillin and non-toxic salts thereof.

4. The compound of claim 3 wherein said salt is potassium; which is potassium (2-nitropyrrol-1-yl-methyl)-penicillin.

5. The compounds of claim 1 wherein $R^1$, $R^2$, $R^3$, $R^4$, $R^5$ are hydrogen, which is (pyrrol-1-yl-methyl)-penicillin and non-toxic salts thereof.

6. The compound of claim 5 wherein said salt is potassium; which is potassium (pyrrol-1-yl-methyl)-penicillin.

7. The compounds of claim 1 wherein $R^1$ is ethoxycarbonyl; $R^2$, $R^3$, $R^4$, are methyl; $R^5$ is hydrogen, which is [(2-ethoxycarbonyl-3,4,5-trimethylpyrrol-1-yl)-methyl]-penicillin, and non-toxic salts thereof.

8. The compound of claim 7 wherein said salt is potassium; which is potassium [(2-ethoxycarbonyl-3,4,5-trimethylpyrrol-1-yl)-methyl]-penicillin.

9. The compounds of claim 1 wherein $R^1$, $R^4$ are methyl; $R^2$, $R^3$, $R^5$ are hydrogen; which is [(2,5-dimethylpyrrol-1-yl)-methyl]-penicillin and non-toxic salts thereof.

10. The compound of claim 9 wherein said salt is potassium; which is potassium [(2,5-dimethylpyrrol-1-yl)-methyl]-penicillin.

11. The compounds of claim 1 where $R^1$ is ethoxycarbonyl; $R^2$, $R^4$ are methyl; $R^3$ is acetyl; $R^5$ is hydrogen; which is [(3-acetyl-5-ethoxycarbonyl-2,4-dimethylpyrrol-1-yl)-methyl]-penicillin and non-toxic salts thereof.

12. The compound of claim 11 wherein said salt is potassium; which is potassium [(3-acetyl-5-ethoxycarbonyl-2,4-dimethylpyrrol-1-yl)-methyl]-penicillin.

13. The compounds of claim 1 wherein $R^1$ is cyano; $R^2$, $R^3$, $R^4$, $R^5$ are hydrogen; which is [(2-cyanopyrrol-1-yl)-methyl]-penicillin and non-toxic salts thereof.

14. The compound of claim 13 wherein said salt is potassium; which is potassium [(2-cyanopyrrol-1-yl)-methyl]-penicillin.

15. The compound of claim 1 wherein $R^1$, $R^2$, $R^3$, $R^4$ are hydrogen; $R^5$ is isopropyl; which is (2-methyl-1-pyrrol-1-yl-propyl)-penicillin and non-toxic salts thereof.

16. The compound of claim 15 wherein said salt is potassium; which is potassium (2-methyl-1-pyrrol-1-yl-propyl)-penicillin (Isomer A).

17. The compound of claim 15 wherein said salt is potassium; which is potassium (2-methyl-1-pyrrol-1-yl-propyl)-penicillin (Isomer B).

18. The compound of claim 1 wherein $R^1$, $R^2$, $R^3$, $R^4$ are hydrogen; $R^5$ is benzyl; which is [(R)-α-pyrrol-1-yl-phenylethyl]-penicillin and non-toxic salts thereof.

19. The compound of claim 18 wherein said salt is potassium; which is potassium [(R)-α-pyrrol-1-yl-phenylethyl]-penicillin.

20. The compound of claim 1 wherein $R^1$, $R^2$, $R^3$, $R^4$ are hydrogen; $R^5$ is hydroxymethyl; which is (2-hydroxy-1-pyrrol-1-yl-ethyl)-penicillin and non-toxic salts thereof.

21. The compound of claim 20 wherein said salt is potassium; which is potassium (2-hydroxy-1-pyrrol-1-yl-ethyl)-penicillin.

22. The compounds of claim 1 wherein $R^1$, $R^2$, $R^3$, and $R^4$ are hydrogen; $R^5$ is phenyl; which is [(R)-α-pyrrol-1-yl-benzyl]-penicillin and non-toxic salts thereof.

23. The compound of claim 22 wherein said salt is potassium [(R)-α-pyrrol-1-yl-benzyl]-penicillin.

24. The compound of claim 22 wherein said salt is triethylammonium, which is triethylammonium [(R)-α-pyrrol-1-yl-benzyl]-penicillin.

25. The compounds of claim 1 wherein $R^1$, $R^2$, $R^3$, and $R^4$ are hydrogen, lower alkyl, lower alkoxy, carboxyl, nitro, or cyano and $R^5$ is hydrogen, lower alkyl, hydroxy lower alkyl, amino lower alkyl, phenyl or phenyl lower alkyl.

26. The compounds of claim 25 wherein $R^1$, $R^2$, $R^3$, $R^4$ are hydrogen, and $R^5$ is hydroxy lower alkyl or amino lower alkyl.

References Cited

UNITED STATES PATENTS 3,352,850  11/1967  Doyle et al. _____ 260—239.1

NICHOLAS S. RIZZO, Primary Examiner

U.S. Cl. X.R.

424—271